(12) United States Patent
Babar et al.

(10) Patent No.: US 10,519,255 B2
(45) Date of Patent: Dec. 31, 2019

(54) PROCESS FOR PREPARING VINYL ACETATE-ETHYLENE COPOLYMERS BY EMULSION POLYMERIZATION

(71) Applicant: Wacker Chemie AG, Munich (DE)

(72) Inventors: Muhammad Babar, Burghausen (DE);
Bernhard Eckl, Burghausen (DE);
Wolf-Dieter Hergeth, Julbach (DE);
Hans-Peter Weitzel, Reischach (DE)

(73) Assignee: Wacker Chemie AG, Munich (DE)

( * ) Notice: Subject to any disclaimer, the term of this patent is extended or adjusted under 35 U.S.C. 154(b) by 90 days.

(21) Appl. No.: 15/759,114

(22) PCT Filed: Jun. 29, 2016

(86) PCT No.: PCT/EP2016/065171
§ 371 (c)(1),
(2) Date: Mar. 9, 2018

(87) PCT Pub. No.: WO2018/001474
PCT Pub. Date: Jan. 4, 2018

(65) Prior Publication Data
US 2018/0282440 A1    Oct. 4, 2018

(51) Int. Cl.
*C08F 210/02* (2006.01)
*C08F 218/08* (2006.01)
(Continued)

(52) U.S. Cl.
CPC .............. *C08F 2/22* (2013.01); *B01J 19/1806* (2013.01); *C08F 2/01* (2013.01); *C08F 120/14* (2013.01);
(Continued)

(58) Field of Classification Search
None
See application file for complete search history.

(56) References Cited

U.S. PATENT DOCUMENTS

| 4,022,744 A | 5/1977 | D'Achille et al. |
| 5,470,539 A | 11/1995 | Imamura et al. |

(Continued)

FOREIGN PATENT DOCUMENTS

| DE | 1071341 B * | 7/1957 |
| DE | 2555142 A1 | 6/1976 |

(Continued)

OTHER PUBLICATIONS

International Search Report and Written Opinion for International Application No. PCT/EP2016/065171, dated Mar. 20, 2017—6 Pages.

(Continued)

*Primary Examiner* — Richard A Huhn
(74) *Attorney, Agent, or Firm* — RatnerPrestia

(57) ABSTRACT

Subjects of the invention are processes for preparing vinyl acetate-ethylene copolymers in the form of their aqueous dispersions or water-redispersible powders by means of radically initiated emulsion polymerization and optional subsequent drying of the resultant polymer dispersions, characterized in that the emulsion polymerization of vinyl acetate, ethylene and optionally one or more further ethylenically unsaturated monomers is carried out in the presence of one or more protective colloids in one or more Taylor reactors.

11 Claims, 1 Drawing Sheet

(51) Int. Cl.
  *C08F 2/01* (2006.01)
  *C08F 2/22* (2006.01)
  *B01J 19/18* (2006.01)
  *C08F 120/14* (2006.01)

(52) U.S. Cl.
  CPC .......... *C08F 210/02* (2013.01); *C08F 218/08* (2013.01); *B01J 2219/00033* (2013.01); *B01J 2219/00049* (2013.01); *B01J 2219/1943* (2013.01); *C08F 2800/20* (2013.01)

(56) References Cited

U.S. PATENT DOCUMENTS

| | | |
|---|---|---|
| 7,122,161 B1 | 10/2006 | Moritz et al. |
| 9,068,031 B2 | 6/2015 | Paul et al. |
| 9,617,448 B2 | 4/2017 | Weiher et al. |
| 2002/0035192 A1* | 3/2002 | Weitzel ................ C08F 218/04 524/459 |
| 2004/0048969 A1 | 3/2004 | Kirsch et al. |
| 2005/0159656 A1 | 7/2005 | Jung et al. |
| 2006/0062702 A1 | 3/2006 | Hagemeister et al. |
| 2006/0204406 A1 | 9/2006 | Jung et al. |

FOREIGN PATENT DOCUMENTS

| | | |
|---|---|---|
| DE | 19828742 A1 | 12/1999 |
| DE | 19960389 A1 | 7/2001 |
| DE | 10150483 A1 | 4/2003 |
| EP | 0498583 A1 | 8/1992 |
| EP | 2471594 A1 | 7/2012 |
| WO | 0000280 A1 | 1/2000 |
| WO | 02059158 A2 | 8/2002 |
| WO | 2013113893 A1 | 8/2013 |

OTHER PUBLICATIONS

Fikentscher, "Systematik der Cellulosen auf Grund ihrer viskositat in Losung", Cellulosechemie, vol. 58, 1932 with abstract, 13 pages.
Schulze, "Redispersionspulver im Zement", TIZ, vol. 109, No. 9, 1985 with abstract, 7 pages.
Fox, "Influence of Diluent and of C opolymer Composition on the Glass Temperature of a Polymer System", American Physics Society, vol. 1, No. 3, 1956, 1 page.
Brandrup et al "Polymer Handbook", 2nd Edition, 1975, 58 pages.

* cited by examiner

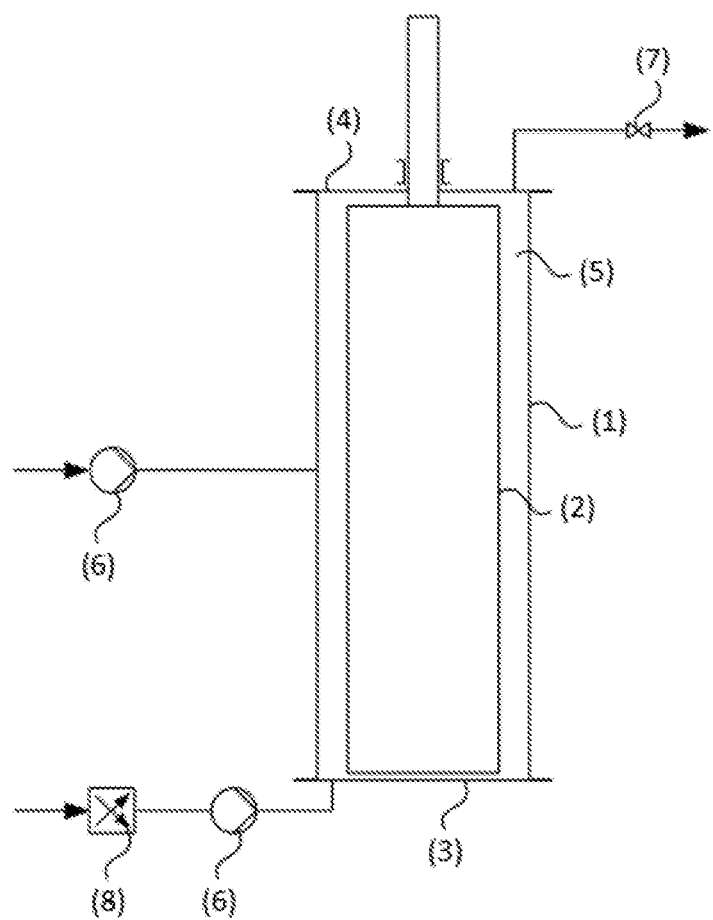

PROCESS FOR PREPARING VINYL ACETATE-ETHYLENE COPOLYMERS BY EMULSION POLYMERIZATION

This application is a U.S. National Stage filing of International Application No. PCT/EP2016/065171, filed 29 Jun. 2016, the entire content of which is incorporated herein by reference.

FIELD OF INVENTION

The present invention relates to processes for preparing vinyl acetate-ethylene copolymers in the form of their aqueous dispersions or water-redispersible powders by means of radically initiated emulsion polymerization of vinyl acetate, ethylene and optionally further ethylenically unsaturated monomers in the presence or protective colloids, and optional subsequent drying.

BACKGROUND

Batch, semi-batch or continuous processes are established for the emulsion polymerization of ethylenically unsaturated monomers. Batch or semi-batch processes are carried out usually in stirred reactors, and continuous processes in stirred tank cascades, tubular reactors or loop reactors. Thus, for example, DE 2555142 describes continuous processes for the emulsion polymerization of ethylenically unsaturated monomers in a plurality of serially connected polymerization reactors. WO 02/59158 teaches polymerization in reactors having an external cooling circuit, in which the polymerization mixture is pumped in a circuit, and at least a portion of the monomers are metered into the external circuit. When being pumped, dispersed polymer particles exhibit a tendency towards coagulation, owing to the shearing forces they experience in the process, and this is a factor especially in the case of high-volume mixtures.

For the continuous bulk polymerization of ethylenically unsaturated monomers, US 2005/0159565 and US 2006/0062702 recommend Taylor reactors, whose reactor chamber widens the reactor entry towards the reactor exit. US 2006/0204406 proposes similar Taylor reactors for the solution polymerization of ethylenically unsaturated monomers. DE 10150483 discloses the use of Taylor reactors for the preparation of poly(meth)acrylates by emulsion polymerization in the presence of emulsifiers. EP 2471594 describes Taylor reactors equipped with wipers or scrapers for producing synthetic rubbers by polymerization in organic solvents.

WO 00/00280 teaches Taylor reactors with specific reactor volume geometry, and recommends such reactors for a wide variety of different, end-use applications—for example, for polymer-analogous reactions, production of polyurethane resins or polyureas, or else for polymerization of a wide variety of different ethylenically unsaturated monomers in solution. DE 19960389 as well recommends similar Taylor reactors for a wide variety of different polymer technologies. EP 0498583 describes Taylor reactors for the emulsion polymerization of a wide variety of different ethylenically unsaturated monomers.

SUMMARY

Against this background, the problem was to be able, during the emulsion polymerization of vinyl acetate and ethylene in the presence of protective colloids, to deliberately and efficiently vary the average particle sizes or particle size distributions of the copolymers without varying the formulas of the polymerization mixtures or without making substantial changes to the polymerization conditions or polymerization processes.

A further problem, especially in the case of continuous emulsion polymerization processes, is that of setting polymerization conditions which are constant over the entire duration of the polymerization and of restricting fluctuation of the process parameters, to form polymers having the same properties over the entire polymerization time.

The object was therefore that of providing processes for the emulsion polymerization of vinyl acetate and ethylene in the presence of protective colloids where it is possible using technically simple measures to exert deliberate variation over the product properties of the copolymers thus obtainable, such as over the average particle sizes or the particle size distribution. As far as possible, furthermore, oscillation in the process parameters during the emulsion polymerization was intended to be restricted.

The object has surprisingly been achieved by carrying out the emulsion polymerization of vinyl acetate and ethylene in the presence of protective colloids in a Taylor reactor. In this way, the average particle sizes and/or the particle size distributions of the vinyl acetate-ethylene copolymers can be varied in a technologically simple way without having to intervene in the polymerization formulas.

Also surprising here was that these effects can be achieved in Taylor reactors in the copolymerization of the monomer ethylene, which is gaseous under standard conditions. In Taylor reactors, indeed, in the toroidal gap between two coaxial, concentric cylinders rotating relative to one another, for example, a regime known as Taylor vortex flow is generated, producing homogeneous mixing of: the components within a Taylor vortex ring as a result of the vortex flow but with different Taylor vortex rings being unable, generally, to mix with one another, or being able to mix only slightly with one another. Accordingly, the components within a Taylor vortex ring react essentially exclusively with one another. In the case of the emulsion polymerization of ethylene and vinyl acetate, which are in gaseous form and liquid form, respectively, under standard conditions, the expectation was that gaseous ethylene would flow through different Taylor vortex rings and, consequently, it would not be possible to achieve the object or the invention using ethylene. Surprisingly, the object of the invention has been achieved when using vinyl acetate, ethylene and protective colloids as components.

Subjects of the invention are processes for preparing vinyl acetate-ethylene copolymers in the form of their aqueous dispersions or water-redispersible powders by means of radically initiated emulsion polymerization and optional subsequent drying of the resultant polymer dispersions, characterized in that the emulsion polymerization of vinyl acetate, ethylene and optionally one or more further ethylenically unsaturated monomers is carried out in the presence of one or more protective colloids in one or more Taylor reactors.

BRIEF DESCRIPTION OF THE DRAWING

The FIGURE illustrates an exemplary design of a Taylor reactor for use in the process of invention.

DETAILED DESCRIPTION

One preferred embodiment of a Taylor reactor of the invention is illustrated by way of example in the FIGURE.

The design of the Taylor reactor in the FIGURE is purely illustrative and is in no way limiting on the present invention.

Taylor reactors (the FIGURE) generally comprise an external reactor wall (1), a rotor (2) located therein, a reactor base (3) and a reactor lid (4), which together define the toroidal reactor volume (5).

Furthermore, Taylor reactors generally comprise at least one metering device (6) and at least one removal device (7). Via metering devices (6) it is possible for reactants or other starting materials to be introduced, preferably continuously, into the toroidal reactor volume (5). The removal device (7) enables polymerization mixture to be taken off from the Taylor reactor, preferably continuously. The metering device (6) may be connected to one or mote mixing assemblies (8).

The path from a metering device (6) to a removal device (7) defines a flow direction of the polymerization mixture through the Taylor reactor. The flow direction indicates the direction in which the polymerization mixture flows through the Taylor reactor.

The external reactor wall (1) which faces the reactor volume (5) is also referred to as the inner wall of the external reactor wall (1). The wall of the rotor (2) that faces the reactor volume (5) is also called the outer wall of the rotor (2).

The shape of the toroidal reactor volume (5) of the Taylor reactor is defined by the geometries of the rotor (2), of the external reactor wall (1), of the reactor base (3) and of the reactor lid (4). The rotor (2) and the external reactor wall (1) may in principle adopt any desired geometries. For instance, the inner wall of the external reactor wall (1) and the outer wall of the rotor (2) may independently of one another have any desired contour over the entire reactor length—as viewed in cross section—such as, for example, an oval, elliptical, triangular, rectangular, square, pentagonal, hexagonal or polygonal contour, optionally with rounded-off angles, or, preferably, a circular contour.

With particular preference, the inner wall of the external reactor wall (1) and the outer wall of the rotor (2) have a cylindrical geometry. Accordingly, the rotor (2) is also referred to as inner cylinder, and the external reactor wall (1) is also referred to as outer cylinder.

The geometry of the toroidal reactor volume (5) is preferably constant in the flow direction. The contour of the external reactor wall (1) and the contour of the rotor (2) are preferably constant in the flow direction; in other words, the diameter of the external reactor wall (1) and the diameter of the rotor (2) are preferably constant in the flow direction. Preferred Taylor reactors therefore do not have a conical external reactor wall (1) and/or a conical rotor (2).

The reactor base (3) and the reactor lid (4) may be designed in a commonplace way. The reactor base (3) and/or the reactor lid (4) close off the reactor volume (5) in, for example, a circular, oval, elliptical or polygonal or, preferably, planar or approximately planar manner.

The rotor (2) preferably reaches from the reactor base (3) to the reactor lid (4).

The surface of the inner wall of the external reactor wall (1) and/or the surface of the outer wall of the rotor (2) may be rough or, preferably, smooth. Alternatively, the stated surfaces may also have a relief-like radial and/or axial, preferably radial, surface profile.

The external reactor wall (1) is preferably stationary, whereas the rotor (2) preferably rotates. In one variant, the external reactor wall (1) and the rotor (2) rotate in the same direction, and the angular velocities of the rotor (2) and of the external reactor wall (1) are different. In another variant, the external reactor wall (1) and the rotor (2) rotate in opposite directions. The external reactor wall (1) and/or the rotor (2) preferably rotate about an axis which passes through the reactor base (3) and the reactor lid (4).

The Taylor reactor—viewed in longitudinal direction or in flow direction—may be mounted vertically, horizontally or in a position between these two directions. The longitudinal direction of the Taylor reactor is generally the path from the reactor base (3) to the reactor lid (4). Vertical mounting is preferred. If the Taylor reactor is not horizontally mounted, the reaction medium is able to flow through it under gravity from top to bottom or, preferably, against gravity from bottom to top.

The rotor (2) of the Taylor reactor may be mounted eccentrically or, preferably, concentrically; in other words, the longitudinal axis of the Taylor reactor may coincide (concentric) or not (eccentric) with the longitudinal axis of the external reactor wall (1).

The Taylor reactor is preferably equipped with at least two, more preferably at least three, and most preferably at least five metering devices (6). By different metering devices (6) it is possible to meter in different starting materials. It is also possible for substances to be supplied at the rate at which they are consumed.

Examples of suitable metering devices (6) are pipes or nozzles. Metering devices (6) may, for example, protrude into the toroidal reactor volume (5) or, preferably, finish flush with the reactor wall. The metering devices (6) are preferably embedded in the external reactor wall (1), in the reactor base (3) in the rotor (2) and/or in the bearing of the rotor (2).

With particular preference the reactor base (3) is provided with at least one metering device (6). At least one metering device (6) is mounted, with particular preference, on the rotor (2) as well, particularly being embedded in the bearing of the rotor (2). With particular preference, one or more metering devices (6) are also embedded in the external reactor wall (1).

Mounted in the external reactor wall (1) there may be two or more metering devices (6) at the same height or, preferably, in local succession in the flow direction, more particularly vertically in succession. There are preferably at least two, more preferably at least three and most preferably at least four, metering devices (6) embedded locally in succession in the flow direction in the external reactor wall (1).

Most preferably there are one or more metering devices (6) mounted in the reactor base (3), one or more metering devices (6) mounted in the rotor (2) or in the bearing of the rotor (2), and at least one, more particularly at least two, metering device(s) (6) mounted locally in succession in the outer reactor wall (1) in the flow direction. With particular preference 1 to 6, more particularly 2 to 4, metering devices (6) are mounted locally in succession in the external reactor wall (1) in the flow direction.

One or more metering devices (6) may be preceded by one or more upstream mixing assemblies (8). In a mixing assembly (8), reactants or other starting materials may be mixed and, where necessary, thermally conditioned. Examples of suitable mixing assemblies (8) are rotor/stator mixers, high-pressure homogenizing assemblies, pressure-release homogenizing nozzles, microfluidizers or static mixers.

Polymerization mixture can be removed from the Taylor reactor via the removal device (7). For example, the external reactor wall (1) or, preferably, the reactor lid (4) may be equipped with one or more removal devices (7). With particular preference there is a removal device (7) at the highest point of the reactor lid (4). The highest point of the reactor lid (4) is the location at the furthest remove from the reactor base (3). Most preferably there is only one removal device (7) mounted on the Taylor reactor.

Furthermore, the Taylor reactor may additionally be equipped with commonplace accessories, for the purpose, for example, of heating and/or cooling, or with one or more measuring means, for measuring the pressure, temperature, concentrations of substances, the solids content or the viscosity, for example.

In the toroidal reactor volume (5) there are preferably no scrapers or wipers. With particular preference there are no scrapers or wipers which within the toroidal reactor volume (5) are connected rotatably to the Taylor reactor. With scrapers or wipers it is possible in the case of conventional Taylor reactors, to remove fouling from the reactor wall, with the scrapers or wipers moving along on the inside of the reactor. In the case of the process of the invention, such measures are advantageously not required.

The individual constituents of the Taylor reactor may be based on commonplace materials, especially metals, such as stainless steel.

The Taylor reactor may have commonplace sizing and may be designed to different sizes in a conventional way.

The average residence time of the polymerization mixture in the Taylor reactor is, for example, 0.5 minutes to 5 hours, preferably 2 minutes to 3 hours, more preferably 10 minutes to 2 hours and most preferably 20 minutes to 45 minutes. The average residence time may be adjusted, for example, via the rate of the metered feeds or via the sizing of the Taylor reactor.

The rotor (2) has a rotational speed of, for example, 10 to 1500 revolutions per minute. One rotation represents a rotation of the rotor (2) about its longitudinal axis or about the axis parallel to the flow direction. In a commonplace way, for example, the rotor (2) may be driven via a magnetic coupling or a mechanical gearing system.

The Taylor number Ta of the polymerization mixture in the Taylor reactor is preferably 1 to 10 000, more preferably 50 to 5000 and most preferably 100 to 2500. The Taylor number is defined by the flowing equation:

$$Ta = \omega_i r_i d v_i^{-1} (d/r_i)^{1/2}$$

where $\omega_i$=angular velocity of the inner cylinder, $r_i$=external radius of the inner cylinder, d=gap width=$r_a - r_i$, $r_a$=inner radius of the outer cylinder and $v_i$=kinematic viscosity of the polymerization mixture in the toroidal gap. The kinematic viscosity $v_i$ is, as is known, the ratio of the Brookfield viscosity to the density of the polymerization mixture. The Brookfield viscosity of the polymerization mixture is determined using a Brookfield viscometer, after thermal conditioning at 20° C., using spindle 1 or 2 at 20 revolutions per minute.

The pressure in the toroidal reactor volume (5) is preferably 10 to 90 $bar_{abs.}$ and more preferably 30 to 80 $bar_{abs.}$.

The temperatures of the polymerization mixture in the toroidal reactor volume (5) are between preferably 40° C. and 120° C. and more preferably between 50 and 110° C.

Reactants and starting materials may be thermally conditioned before being introduced into the Taylor reactor. For example, one or more reactants and/or starting materials may be at a conditioned temperature of between 10° C. and the polymerization temperature when they are introduced into the Taylor reactor. With preference a mixture comprising vinyl acetate, ethylene, protective colloids and optionally initiators, especially reduction initiators, is conditioned to a temperature just below the polymerization temperature, or at polymerization temperature, before they are introduced and/or when they are being introduced into the Taylor reactor. The aforementioned mixtures are preferably conditioned to a temperature between the polymerization temperature and 20° C., more particularly 10° C. below the polymerization temperature. With particular preference, initiators, especially oxidation initiators, are added immediately before entry into the Taylor reactor to a mixture thermally conditioned in this way. The thermal conditioning may take place before, during or after the components have been mixed. For this purpose, it is possible for commonplace heat exchangers to be employed.

The Taylor reactor may be thermally conditioned using commonplace cooling and/or heating devices, such as, for example, jacket coolers or jacket heaters. Cooling and/or heating devices may be mounted, for example, on the Taylor reactor, on the rotor (2), on metering devices (6) or on mixing assemblies (8). For example, the external reactor wall (1) may be provided with a cooling or heating jacket. It is also possible for different zones of the Taylor reactor to be thermally conditioned at different temperatures. With preference the Taylor reactor is uniformly thermally conditioned to a temperature.

Before the beginning of the polymerization, the Taylor reactor is preferably charged with a polymer dispersion which corresponds preferably to the end product of the polymerization, in terms of polymer composition, nature and amount of the protective colloid, and also particle size and solids content. Alternatively, before the beginning of the process of the invention, in other words before the beginning of polymerization, the Taylor reactor may be charged with a mixture which comprises reactants and starting materials, but no initiators, more particularly no oxidation initiators. Lastly, the Taylor reactor may be charged, before the start of the process of the invention, with water, preferably exclusively with water.

The emulsion polymerization in the Taylor reactor is carried out generally in an aqueous medium. With preference no organic, solvents are used.

The Taylor reactor is generally operated continuously. In continuous operation, during the emulsion polymerization, reactants, especially vinyl acetate, ethylene, optionally further ethylenically unsaturated monomers, protective colloids and/or initiators, are introduced into the Taylor reactor via one or more metering devices (6), and polymerization mixture is withdrawn from the Taylor reactor via the removal device (7). In the case of continuous operation, the entering mass flows are to correspond to the emerging mass flows.

In one preferred embodiment, the Taylor reactor is operated in a reactor cascade. A reactor cascade preferably comprises one or more Taylor reactors and one or more further reactors, especially stirred tanks, such as pressure reactors or flash reactors. With particular preference a reactor cascade comprises a Taylor reactor and one or more pressure reactors and/or one or more flash reactors. In a reactor cascade there are preferably at least two or at least three reactors connected in series. In a reactor cascade, for example, a seed can be produced in a Taylor reactor, and the further polymerization for preparing the polymer dispersion can be carried out in a downstream pressure reactor. In a reactor cascade, for example, polymerization mixture is withdrawn at removal device (7) from a Taylor reactor and is introduced into a second reactor, more particularly a stirred tank, such as a pressure reactor or flash reactor, for example. Reactor cascades allow the space-time yield to be increased.

The polymerization may be initiated with commonplace initiators, more particularly with a redox system (redox initiator combination) made up of oxidation component (oxidation initiator) and reduction component (reduction initiator). The monomer conversion is generally controlled by way of the initiator feed.

Via one or more metering devices (6), the individual reactants for the emulsion polymerization, such as vinyl acetate, ethylene, optionally further ethylenically unsaturated monomers, protective colloids and/or initiators, especially oxidation initiators or reduction initiators, are customarily added. The reactants may be added individually or in a premixed form, as pure substance or in the form of a solution, suspension or emulsion. Reactants are preferably prefixed in a mixing unit (8) upstream of a metering device (6).

Via one or more metering devices (6) embedded in the reactor base (3), preferably, monomers, especially vinyl acetate, ethylene and optionally further ethylenically unsaturated monomers, protective colloids, and also any initiators, especially reduction initiators, are added.

Via one or more metering devices (6) embedded in the rotor (2) or in the bearing of the rotor (2), preferably, initiators are added, especially oxidation initiators.

Via one or more metering devices (6) which are embedded in the external reactor wall (1), preferably locally in succession in the flow direction, preferably, monomers and more preferably initiators, especially oxidation initiators, are added.

Graft copolymers, core-shell polymers or copolymers with heterogeneous morphology are obtainable, for example, by metering different ethylenically unsaturated monomers or different monomer compositions via different metering devices (6). For example, its a first section of the Taylor reactor, which follows a first metering device (6), a first polymer unit, such as a backbone polymer, the core of core-shell polymers or a first phase of a heterophase polymer, may be prepared, and in one or more further, locally downstream sections of the Taylor reactor, each following one or more further metering devices (6), one or more further polymer units may be prepared—for example, one or more side branches of graft copolymers, the shell of core-shell polymers, or one or more further phases of heterophase polymers.

After the end of the polymerization, residual monomer may be removed by post-polymerization, employing techniques that are known per se, generally by means of post-polymerization initiated with redox catalyst. The post-polymerization may take place, for example, in a stirred tank. For this purpose, polymerization mixture may be withdrawn from the Taylor reactor at removal device (7) and transferred into a stirred tank. The post-polymerization is preferably carried out in the Taylor reactor, more particularly in the region of the Taylor reactor that borders the reactor lid (4). For this purpose it is possible, for example, for one or more initiators to be added via the metering device (6) which is the closest to the reactor lid (4) in the flow direction.

Volatile constituents, such as residual monomers, may also be removed by distillation, preferably under reduced pressure, and optionally with inert entraining gases such as air, nitrogen or steam being passed through or passed over the mixture. Volatile constituents are removed preferably in a stirred tank.

The vinyl acetate-ethylene copolymers are prepared by radically initiated emulsion polymerization of vinyl acetate, ethylene and, optionally, one or more further ethylenically unsaturated monomers, in the presence of one or more protective colloids.

The fraction of vinyl acetate is preferably at least 50 wt %, more preferably 60 to 95 wt % and most preferably 70 to 90 wt %. The fraction of ethylene is preferably 1 to 50 wt %, more preferably 5 to 40 wt % and most preferably 10 to 30 wt %. The figures in wt % are based in each case on the total weight of the monomers employed overall for the emulsion polymerization.

The further ethylenically unsaturated monomers are preferably selected from the group encompassing vinyl esters of carboxylic acids having 3 to 18 carbon atoms, (meth)acrylic esters, vinylaromatics, olefins having at least 3 carbon atoms, 1,3-dienes and vinyl halides and optionally further monomers copolymerizable therewith. The further ethylenically unsaturated monomers are therefore different from vinyl acetate and ethylene.

Examples of vinyl esters of carboxylic acids having 3 to 18 carbon atoms are vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, for example VeoVa9® VeoVa10® (tradenames of the company Resolution).

Suitable monomers from the group of acrylic esters or methacrylic esters are, for example, esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate. Particularly preferred are methyl acrylate, methyl methacrylate, n-butyl acrylate, tert-butyl acrylate and 2-ethylhexyl acrylate.

Preferred as vinylaromatics are styrene, methylstyrene and vinyltoluene. Preferred vinyl halide is vinyl chloride. Preferred olefin having at least 3 carbon atoms is propylene, and the preferred dienes are 1,3-butadiene and isoprene.

Optionally it is also possible for 0 to 10 wt % of auxiliary monomers, based on the total weight of the monomer mixture, to be co-polymerized. Preference is given to using 0.1 to 5 wt % of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carbonamides and carbonitriles, preferably acrylamide and acrylonitrile; monoesters and diesters of fumaric acid and maleic acid such as the diethyl esters and diisopropyl esters, and also maleic anhydride; ethylenically unsaturated sulphonic acids and their salts, preferably vinylsulphonic acid, 2-acrylamido-2-methylpropanesulphonic acid. Other examples are pre-crosslinking comonomers such as polyethylenically unsaturated comonomers, examples being diallyl phthalate, divinyl adipate, diallyl maleate, allyl methacrylate or triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate. Also suitable are epoxide-functional comonomers such as glycidyl methacrylate and glycidyl acrylate. Further examples are silicon-functional comonomers, such as acryloyloxypropyltri (alkoxy)- and methacryloyloxypropyl-tri(alkoxy)-silanes, vinyltrialkoxysilanes and vinylmethyldialkoxysilanes, where alkoxy groups present may be, for example, ethoxy and ethoxypropylene glycol ether radicals. Mention may also be made of monomers having hydroxy or CO groups, examples being hydroxyalkyl esters of acrylic and methacrylic acid such as hydroxyethyl, hydroxypropyl or hydroxybutyl acrylate or methacrylate, and also compounds such as diacetoneacrylamide and acetylacetoxyethyl acrylate or methacrylate.

Preference is given to monomer mixtures of vinyl acetate with 1 to 50 wt % of ethylene; monomer mixtures of vinyl acetate with 1 to 50 wt % of ethylene and 1 to 50 wt % of one or more further comonomers from the group of vinylesters having 3 to 12 carbon atoms in the carboxyl radical such as vinyl propionate, vinyl laurate, vinyl esters of alpha-branched carboxylic acids having 9 to 13 carbon atoms such as VeoVa9, VeoVa10, VeoVa11; monomer mixtures of vinyl acetate, 1 to 50 wt % of ethylene and preferably 1 to 60 wt % of (meth)acrylic esters of unbranched or branched alcohols having 1 to 15 carbon atoms, especially n-butyl acrylate or 2-ethylhexyl acrylate; and monomer mixtures with 30 to 75 wt % of vinyl acetate, 1 to 30 wt % of vinyl laurate or vinyl esters of an alpha-branched carboxylic acid having 9 to 11 carbon atoms, and also 1 to 30 wt % of (meth)acrylic esters of unbranched or branched alcohols having 1 to 15 carbon atoms, especially n-butyl acrylate or 2-ethylhexyl acrylate, which additionally contain 1 to 40 wt % of ethylene; monomer mixtures with vinyl acetate, 1 to 50 wt % of ethylene and 1 to 60 wt % of vinyl chloride; the monomer mixtures may further include the stated auxiliary monomers in the stated amounts, and the figures in wt % add up to 100 wt % in each case.

Maximum preference is given to monomer mixtures with vinyl acetate and 5 to 50 wt % of ethylene; or monomer mixtures with vinyl acetate, 1 to 50 wt % of ethylene and 1 to 50 wt % of a vinyl ester of α-branched monocarboxylic acids having 9 to 11 carbon atoms; or monomer mixtures with 30 to 75 wt % of vinyl acetate, 1 to 30 wt % of vinyl laurate or vinyl esters of an alpha-branched carboxylic acid having 9 to 11 carbon atoms, and also 1 to 30 wt % of (meth)acrylic acid esters of unbranched or branched alcohols having 1 to 15 carbon atoms, which additionally contain 1 to 40 wt % of ethylene; or monomer mixtures with vinyl acetate, 5 to 50 wt % of ethylene and 1 to 60 wt % of vinyl chloride.

The monomer selection and/or the selection of the weight fractions of the comonomers are made such that in general the resulting glass transition temperature Tg is from −50° C. to +50° C., preferably from −20° C. to +30° C. The glass transition temperature Tg of the polymers can be determined in a known way by DSC (Dynamic Differential Thermoanalysis, DIN EN ISO 11357-1/2), for example using the Dynamic Differential Calorimeter DSC1 from Mettler-Toledo, in an open crucible with a heating rate of 10 K/min. The glass transition temperature taken is the temperature at the midpoint of the step in the heat flow diagram (midpoint=half step height of the heat flow step) of the second heating curve. The Tg may also be calculated approximately in advance using the Fox equation. According to Fox T. G., Bull. Am. Physics Soc. 1, 3, page 123 (1956): $1/Tg=x_1/Tg_1+x_2/Tg_2+\ldots+x_n/Tg_n$, where $x_n$ is the mass fraction (wt %/100) of the monomer n, and $Tg_n$ is the glass transition temperature in Kelvins of the homopolymer of the monomer n. Tg values for homopolymers are listed in Polymer Handbook 2nd Edition, J. Wiley & Sons, New York (1975).

The polymerization takes place according to the emulsion polymerization process. The polymerization temperature is generally 40° C. to 120° C., preferably 50° C. to 110° C., more preferably 50° C. to 100° C. and most preferably 60° C. to 90° C.

The polymerization is initiated using the initiators customary for emulsion polymerization, especially redox initiator combinations. Examples of suitable oxidation initiators are the sodium, potassium and ammonium salts of peroxodisulphuric acid, hydrogen peroxide, tert-butyl peroxide, tert-butyl hydroperoxide, cumene hydroperoxide, isopropylbenzene monohydroperoxide and azobisisobutyronitrile. Preference is given to the sodium, potassium and ammonium salts of peroxydisulphuric acid, and hydrogen peroxide. The stated initiators are used generally in an amount of 0.01 to 2.0 wt %, based on the total weight of the monomers.

Suitable reducing agents, also called reduction initiators, are the sulphites and bisulphites of the alkali metals and of ammonium, for example sodium sulphite, the derivatives of sulphoxylic acid such as zinc or alkali metal formaldehyde-sulphoxylates, for example sodium hydroxymethanesulphinate (Bruggolite) and (iso)ascorbic acid. Preference is given to sodium hydroxymethanesulphinate and (iso)ascorbic acid. The amount of reducing agent is 0.015 to 3 wt %, based on the total weight of the monomers.

In order to control the molecular weight it is possible to use substances with a chain transfer effect during the polymerization. If chain transfer agents are used, they are employed customarily in amounts between 0.01 to 5.0 wt %; based on the monomers to be polymerized, and are metered separately or else as a premix with reaction components. Examples of such agents are n-dodecyl mercaptan, tert-dodecyl mercaptan, mercaptopropionic acid, ethyl mercaptopropionate, isopropanol and acetaldehyde. With preference no chain transfer agents are used.

Examples of protective colloids are polyvinyl alcohols; polyvinlypyrrolidones; polyvinyl acetals; polysaccharides in water-soluble form such as starches (amylose and amylopectin), celluloses and their carboxymethyl, methyl, hydroxyethyl and hydroxypropyl derivatives; proteins such as casein or caseinate, soy protein, gelatine, lignosulphonates; synthetic polymers such as poly(meth)acrylic acid, copolymers of (meth)acrylates with carboxyl-functional comonomer units, poly(meth)acrylamide, polyvinylsulphonic acids and their water-soluble copolymers; melamine-formaldehydesulphonates, naphthalene-formaldehydesulphonates, styrene-maleic acid and vinyl ether-maleic acid copolymers; and cationic polymers such as polyDADMAC.

Preferred protective colloids are partially hydrolysed or fully hydrolysed polyvinyl alcohols. Particularly preferred are partially hydrolysed polyvinyl alcohols having a degree of hydrolysis of 80 to 95 mol % and a Höppler viscosity in 4% strength aqueous solution of 1 to 30 mPas (Höppler method at 20° C., DIN 53015). Also particularly preferred are partially hydrolysed, hydrophobically modified polyvinyl alcohols having a degree of hydrolysis of 80 to 95 mol % and a Höppler viscosity in 4% strength aqueous solution of 1 to 30 mPas. Examples thereof are partially hydrolysed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleinates and dialkyl fumarates such an diisopropyl maleinate and diisopropyl fumarate, vinyl chloride, vinyl alkyl ethers such as vinyl butyl ether, and olefins such as ethene and decene. The fraction of the hydrophobic units is preferably 0.1 to 10 wt %, based on the total weight of the partially hydrolysed polyvinyl alcohol. Mixtures of the stated polyvinyl alcohols may also be used.

Maximum preference is given to polyvinyl alcohols having a degree of hydrolysis of 35 to 94 mol % and a Höppler viscosity in 4% strength aqueous solution of 3 to 15 mPas (Höppler method at 20° C., DIN 53015). The stated protective colloids are obtainable by means of methods known to the skilled person. The polyvinyl alcohols are added during the polymerization generally in an amount of in total 1 to 20 wt %, based on the total weight of the monomers.

In the case of the processes of the invention, preference is given to carrying out polymerization without addition of emulsifiers. In exceptional cases it may be an advantage to use emulsifiers, optionally at 1 to 10 wt %, based on the monomer amount. Suitable emulsifiers include anionic, cationic and non-ionic emulsifiers, examples being anionic surfactants, such as alkyl sulphates having a chain length of 8 to 18 carbon atoms, alkyl or alkylaryl ether sulphates having 8 to 18 carbon atoms in the hydrophobic radical and up to 40 ethylene oxide or propylene oxide units, alkyl- or alkylarylsulphonates having 8 to 18 carbon atoms, full esters and monoesters of sulphosuccinic acid with monohydric alcohols or alkylphenols, or non-ionic surfactants such as alkyl polyglycol ethers or alkylaryl polyglycol ethers having 8 to 40 ethylene oxide units.

The aqueous dispersions obtainable with the process of the invention have a solids content of 30 to 75 wt %, preferably of 50 to 60 wt %.

To produce the water-redispersible polymer powders, the aqueous dispersions are dried, optionally after addition of one or more drying aids, such as protective colloids, by means of fluidized bed drying, freeze drying or spray drying, for example. The dispersions are preferably spray-dried. This spray drying takes place in customary spray-drying units, in which atomization may be accomplished using single-fluid, two-fluid, or multi-fluid nozzles or with a rotating disc. The exit temperature selected is generally in the range from 45° C. to 120° C., preferably 60° C. to 90° C., depending on unit, resin Tg and desired degree of drying.

As drying aids it is possible to use one or more of the aforementioned protective colloids. With preference polyvinyl alcohols exclusively are used as drying aids. In general the fraction of the drying aid is 3 to 30 wt %, based on the total weight of the polymer powder. The total amount of protective colloid before the drying operation is preferably 3 to 30 wt %, based on the polymer fraction; preference is given to using 5 to 20 wt %, based on the polymer fraction, as a drying aid.

In the case of nozzle spraying, an amount of up to 1.5 wt % of antifoam, based on the base polymer, has proven to be favourable in many cases. To prolong the shelf life by improvement in the blocking stability, particularly in the case of powders with a low glass transition temperature, the resulting powder may be furnished with an anti-blocking agent (anti-caking agent), preferably at up to 30 wt %, based on the total weight of polymeric constituents. Examples of anti-blocking agents are Ca and/or Mg carbonate, talc, gypsum, silica, kaolins, metakaolin, silicates with particle sizes preferably in the range from 10 nm to 40 µm, more preferably 10 nm to 10 µm.

The viscosity of the nozzle-spraying feed is adjusted by the solids content so as to give a value of <500 mPas (Brookfield viscosity at 20 revolutions and 23° C.), preferably <250 mPas. The solids content of the dispersion for nozzle spraying is generally >35%, preferably >45%.

In order to improve the performance properties it is possible for further additions to be made during drying. Examples of further dispersion powder composition constituents which are present in preferred embodiments include pigments, fillers, foam stabilizers and hydrophobilizing agents.

Polymers in the form of water-redispersible powders (polymer powders) are, generally, powder compositions which are made available by means of drying of the corresponding aqueous polymer dispersions in the presence of protective colloids. On the basis of this production process, the finely divided polymer resin of the dispersion is enveloped with a water-soluble protective colloid in sufficient quantity. In the course of drying, the protective colloid acts like a jacket, preventing the particles from sticking to one another. On redispersing of the polymer powders in water, the protective colloid dissolves again in water to give an aqueous dispersion of the original polymer particles (Schulze J. in TIZ, No. 9, 1985).

The aqueous polymer dispersions and the water-redispersible, protective colloid-stabilized polymer powders can be used in the areas of application that are typical for such systems. Examples include chemical products in the construction industry, optionally in conjunction with hydraulically setting binders such as cements (Portland cement, high-alumina cement, trass cement, glass furnace cement, magnesia cement, phosphate cement), gypsum and waterglass, for the production of construction adhesives, especially tile adhesives and thermal insulation composition system adhesives, renders, filling compounds, flooring compounds, levelling compounds, grouts, jointing mortars and paints. Further examples are as binders for coating materials and adhesive-bonding materials, or as coating agents and/or binding agents for textiles and paper.

A key advantage of the process of the invention is that through variations in the mode of operation of the Taylor reactor, such variations being simple to implement from a technical standpoint, it is possible to achieve targeted variation in the properties of the vinyl acetate-ethylene copolymers, such as their average particle sizes or particle size distribution. This can be achieved, for example, by varying the speed of the rotor (2), the rates of metered feed or the location of metered feed of the various inputs, particularly of the initiators. Bimodal or polymodal particle size distributions are obtainable, for example, by raising the initiator feed towards the end of the Taylor reactor. Vinyl acetate-ethylene copolymers having heterogeneous morphology are obtainable by introducing different monomers or different monomer compositions into the Taylor reactor at different metering devices (6). By technically simple measures, therefore, vinyl acetate-ethylene copolymers with different spectra of properties are obtainable. The process of the invention is therefore characterized by a high flexibility. Conversely, conventional processes commonly require variations in the polymerization formulas in order to achieve effects of this kind.

Surprisingly, these effects are obtainable when using gaseous monomers and even when carrying out the emulsion polymerization under high pressure in the Taylor reactor. Separation of gaseous monomers on inventive operation of the Taylor reactor has not been observed. Separation of gaseous polymers would thwart their incorporation into the copolymers and would therefore result in copolymers that were completely unusable. A surprising finding here as well was that on emulsion polymerization of gaseous monomers, no problems occurred on the bearing of the rotor in the Taylor reactor, and the Taylor reactor withstood conditions of such harshness without detriment.

In spite of the presence of different components, such as protective colloids, vinyl acetate-ethylene copolymers or monomers, no demixing or separation of input substances was observed during inventive operation of the Taylor reactor.

It was also surprising that the shearing forces which occurred in the polymerization mixture in the Taylor reactor or on discharge from the Taylor reactor did not result in the coagulation of the polymerization mixture that takes place, deleteriously, when shearing forces of this extent occur in conventional loop reactors or stirred tank reactors. Coagulation causes reactor fouling or even blockage of reactors. Coagulum also has to be removed from the product by filtration at cost and inconvenience. With the process of the invention, advantageously, relatively little or no deposit was formed on the walls of the Taylor reactor.

All in all, the process of the invention allows the production of vinyl acetate-ethylene copolymers with high monomer conversion rates and high space-time yields.

Another surprising finding was that with the process of the invention, vinyl acetate-ethylene copolymers can be obtained which have a spectrum of properties like that of those formed in conventional processes with stirred tanks. Accordingly, such conventional processes can be substituted by the process of the invention.

The examples which follow serve for detailed elucidation of the invention and should in no way be understood as imposing any limitation.

Determination of Brookfield Viscosity

For this purpose, the respective aqueous polymer dispersion was conditioned to 23° C. and then the viscosity was determined with a Brookfield viscometer, using spindle 1 or 2, at 20 revolutions per minute.

Determination of K Value

A dispersion sample of the respective polymer dispersion, containing 0.5 g of polymer (without polyvinyl alcohol) and 4 g of water, was produced by weighing out the polymer dispersion into a 50 ml volumetric flask. Tetrahydrofuran (THF) was slowly added dropwise, with stirring, until a clear solution was formed. After conditioning to 23° C., the solution was made up to the calibration mark with THF. The measuring solution had a concentration of 1 g of polymer per 100 ml of solution. Taking account of the Hagenbach correction, the viscosity of a gel-free sample of the measuring solution and of the polymer-free reference solution was determined in an Ubbelohde viscometer (capillary 1c) at 23° C. and used to ascertain the relative solution viscosity $\theta_{rel}$. This parameter was used for calculation of the "inherent viscosity k" by the method of Fikentscher, Cellulosechemie 13 (1932) 58, and of the "K value" at K=1000 k. For the inherent viscosity k, the following relationship applies:

$$k = \frac{1}{2}\left(\frac{1.5 c_V \log \eta_{rel} - c_V}{1.5 c_V^2 + 75 c_V}\right) + \left[\left(\frac{1}{2}\left(\frac{1.5 c_V \log \eta_{rel} - c_V}{1.5 c_V^2 + 75 c_V}\right)\right)^2 + \frac{\log \eta_{rel}}{1.5 c_V^2 + 75 c_V}\right]^{1/2},$$

using the concentration $c_v$ in g/dl.

The K value is a customary and useful statistic which correlates with the viscometric average molar mass of the polymer. The K value is of course dependent on the copolymer composition and decreases as the ethylene content of a vinyl acetate-ethylene copolymer goes up.

Determination of Average Volume-Weighted Particle Size

For this purpose, the Beckmann Coulter® LS 13320 instrument was used in accordance with the instrument protocol, using the optical model PVAC.RF780D and the optical constant for polyvinyl acetate. The respective dispersion was diluted with water. The particle size reported is the central value of the volume distribution function of the particle diameter ×3, 50 in μm.

Comparative Example 1 (Batch Mode)

A stirred tank reactor with a capacity of 600 litres was charged with 15 kg of Celvol 523 (10% in water, partially hydrolysed polyvinyl alcohol having a Höppler viscosity (10% in water) of 25 mPas), 96 kg of M 04/140 (20% in water, partially hydrolysed polyvinyl alcohol having a Höppler viscosity (10% in water) of 4 mPas) and 110 kg of water. The aqueous initial charge was brought to a ph of 4.0 using formic acid. This mixture was admixed with 11 g of iron(II) ammonium sulphate and 250 kg of vinyl acetate. The rotary speed of the impeller stirrer was set at 240 revolutions per minute, the batch was heated to 60° C., and 21 kg of ethylene were injected. Subsequently, tert-butyl hydroperoxide (3% in water) and ascorbic acid (5% in water) were run in at metering rates each of 1.3 kg/h and the hatch was heated to 90° C. When the internal reactor temperature reached 79° C., the metering rates of tert-butyl hydroperoxide and ascorbic acid were each raised to 1.8 kg/hour. 63 kg of vinyl acetate were metered in over 50 minutes, and a mixture of 20 g of M04/140 polyvinyl alcohol in 10 litres of water was metered in over 65 minutes, and 16 kg of ethylene were injected additionally at 48 bar. After the end of the vinyl acetate feed, cooling to 70° C. was carried out over 15 minutes. Metered additions of tert-butyl hydroperoxide (3% in water) and ascorbic acid (5% in water) continued until an internal reactor pressure of 15 bar was reached. The stirred tank was than cooled to 55° C. and the polymer dispersion was transferred to a flash vessel, with addition of 84 g of a silicone defoamer, and was devolatilized for 30 minutes. Finally, 2.4 kg of tert-butyl hydroperoxide (10% in water; and 4.8 g of ascorbic acid (5% in water) were added as preservatives.

The properties of the dispersion thus obtained were as follows:
Solids content: 56.5%
Brookfield viscosity: 1004 mPas,
K value: 110,
Average volume-weighted particle size: 1.103 μm.

In the following examples, a Taylor reactor equipped and operated as follows was employed:
Inner cylinder: diameter of 15.4 cm,
Toroidal gap width: 6 mm,
Internal reactor volume: 6.9 litres,
Rotary speed of inner cylinder: 400 to 1400 revolutions per minute, as specified in each example,
Reactor length or length of the inner cylinder: 1.60 m;
the Taylor reactor was provided with metering devices at the following locations:
  Metering device 1: on the reactor base,
  Metering device 2: was connected to metering device 1 shortly before the point of attachment of the latter on the reactor base;

the metering devices 3 to 5 were embedded in the external reactor wall, at the following distances from the reactor base:
Metering device 3: 40 cm above the reactor base,
Metering device 4: 80 cm above the reactor base,
Metering device 5: 120 cm above the reactor base.

Example 2

The Taylor reactor was filled with water and heated via the heating jacket to 80° C. The rotary speed of the inner cylinder was set at 1300 revolutions per minute. The Taylor reactor was operated with an internal reactor pressure of 48 bar.

In a preliminary emulsion vessel, a mixture of 0.52 kg of the polyvinyl alcohol Celvol V523 (10% in water), 3.8 kg of the polyvinyl alcohol M04/140 (20% in water), 5.2 g of ascorbic acid (in 1.9 kg of water), 10 kg of vinyl acetate and 1.22 kg of ethylene were introduced, adjusted to a pH of 4.0 with formic acid and heated to 80° C. with stirring. In the preliminary emulsion vessel as well, the prevailing pressure was 48 bar.

Over the course of 24 hours, via a feed line through the metering device 1, the fixture thus prepared in the preliminary emulsion vessel was introduced continuously through the reactor base into the Taylor reactor.

At the four metering devices 2~5 of the Taylor reactor, potassium persulphate (3.0% in water) was metered in at the following metering rates: metering device 2: 50 ml/h, metering device 3: 45 ml/h, metering device 4: 38 ml/h, metering device 5: 32 ml/h.

Polymerization mixture was withdrawn continuously via a removal device of the Taylor reactor, and was transferred to a flash vessel, and was post-polymerized conventionally at 60° C. with addition of 41 g of tert-butyl hydroperoxide (10% in water) and 81 g of ascorbic acid (5% in water).

The polymer dispersion thus obtained was cooled to 20° C. and had the following properties:
Solids content: 56%
Brookfield viscosity: 534 mPas,
K value: 109,
Average volume-weighted particle size: 1.616 µm.

Example 3

The polymerization was initiated thermally, and so no ascorbic acid was employed.
Example 3 was performed in the same way as Example 2, with the following differences:
The mixture in the preliminary emulsion vessel contained no ascorbic acid,
The rotary speed of the inner cylinder was 900 revolutions per minute,
Metering rates for the metered addition of potassium persulphate (3% in water): metering device 2: 65 ml/h, metering device 3: 58 ml/h, metering device 4: 50 ml/h, metering device 5: 43 ml/h.
The polymer dispersion thus obtained had the following properties:
Solids content: 57%,
Brookfield viscosity: 674 mPas,
K value: 102,
Average volume-weighted particle size: 1.785 µm.

Example 4

Example 4 was performed in the same way as Example 3, with the difference that the rotary speed of the inner cylinder was 1400 revolutions per minute.

The polymer dispersion thus obtained had the following properties:
Solids content: 56%
Brookfield viscosity: 380 mPas,
K value: 73,
Average volume-weighted particle size: 2.095 µm.

Example 5

Example 5 was performed in the same way as Example 3, with the difference that the rotary speed of the inner cylinder was 400 revolutions per minute.

The polymer dispersion thus obtained had the following properties:
Solids content: 55%
Brookfield viscosity: 1060 mPas,
K value: 101,
Average volume-weighted particle size: 1.214 µm.

Examples 3 to 5 show that when using the identical polymerization formulas, polymer dispersions having different product properties are available by merely varying the mode of operation of the Taylor reactor.

In this case, with the Taylor reactor, it is possible to prepare polymer dispersions which correspond in terms of their profile of properties to conventionally prepared polymer dispersions, as shown with comparative Example 1 and Example 5.

The invention claimed is:

1. A process for preparing vinyl acetate-ethylene copolymers in the form of their aqueous dispersions or water-redispersible powders by means of radically initiated emulsion polymerization and optional subsequent drying of the resultant polymer dispersions, the process comprising emulsion polymerization of vinyl acetate, ethylene and optionally one or more further ethylenically unsaturated monomers in the presence of one or more protective colloids in one or more Taylor reactors, the Taylor reactor comprising an external reactor wall, a rotor located within the external reactor wall, a reactor base, and a reactor lid, the wall, rotor, base, and lid defining a toroidal reactor volume, wherein vinyl acetate, ethylene, protective colloids, and oxidation initiators are added via one or more metering devices that are embedded in the reactor base, and reduction initiators are added via one or more metering devices embedded in a bearing of the rotor.

2. The process according to claim 1, wherein the external reactor wall has an inner wall and the rotor has an outer wall, the inner wall of the external reactor wall and the outer wall of the rotor each having a cylindrical geometry.

3. The process according to claim 1, wherein the Taylor reactor is equipped with at least three metering devices.

4. The process according to claim 2, wherein at least one metering device is mounted on the reactor base and/or at least one metering device (6) is mounted on a bearing of the rotor and/or at least one metering device is mounted in the external reactor wall.

5. The process according to claim 4, wherein a plurality of metering devices (6) are mounted locally in succession in the external reactor wall in a flow direction.

6. The process according to claim 1, wherein initiators and/or monomers comprising vinyl acetate and/or ethylene are added via one or more metering devices embedded in the external reactor wall.

7. The process according to claim 1, having a pressure in the toroidal reactor volume of 10 to 90 $bar_{abs}$.

8. The process according to claim 1, wherein residual monomer is removed by post-polymerization in a stirred tank or in the Taylor reactor.

9. The process according to claim 1, wherein: vinyl acetate is polymerized with 1 to 50 wt % of ethylene; vinyl acetate is polymerized with 1 to 50 wt % of ethylene and 1 to 50 wt % of one or more vinyl esters having 3 to 12 carbon atoms in the carboxyl radical; vinyl acetate is polymerized with 1 to 50 wt % of ethylene and 1 to 60 wt % of (meth)acrylic esters of unbranched or branched alcohols having 1 to 15 carbon atoms; 30 to 75 wt % of vinyl acetate is polymerized with 1 to 30 wt % of vinyl laurate or vinyl esters of an alpha-branched carboxylic acid having 9 to 11 carbon atoms, and also 1 to 30 wt % of (meth)acrylic esters of unbranched or branched alcohols having 1 to 15 carbon atoms and 1 to 40 wt % of ethylene; or vinyl acetate is polymerized with 1 to 50 wt % of ethylene and 1 to 60 wt % of vinyl chloride; where the figures in wt % add up to 100 wt % in each case.

10. The process according to claim 1, wherein the protective colloids comprise partially hydrolysed or fully hydrolysed polyvinyl alcohols.

11. The process according to claim 1, wherein the polymerization is carried out in the absence of emulsifiers.

* * * * *